US011117072B2

(12) United States Patent
May et al.

(10) Patent No.: US 11,117,072 B2
(45) Date of Patent: Sep. 14, 2021

(54) ULTRASONIC BREAKING OF POLYMER-CONTAINING FLUIDS FOR USE IN SUBTERRANEAN FORMATIONS

(71) Applicant: Halliburton Energy Services, Inc., Houston, TX (US)

(72) Inventors: Preston Andrew May, Porter, TX (US); William Walter Shumway, Spring, TX (US); Kingsley Ihueze Nzeadibe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 16/431,932

(22) Filed: Jun. 5, 2019

(65) Prior Publication Data
US 2020/0001206 A1   Jan. 2, 2020

Related U.S. Application Data

(60) Provisional application No. 62/692,337, filed on Jun. 29, 2018.

(51) Int. Cl.
*B01D 17/04* (2006.01)
*B01D 21/28* (2006.01)
*C09K 8/10* (2006.01)

(52) U.S. Cl.
CPC .......... *B01D 17/04* (2013.01); *B01D 21/286* (2013.01); *C09K 8/10* (2013.01); *C09K 2208/18* (2013.01)

(58) Field of Classification Search
CPC .. C09K 2208/18; C09K 2208/26; C09K 8/03; C09K 8/10; E21B 21/06; B01D 17/04; B01D 21/286
See application file for complete search history.

(56) References Cited

U.S. PATENT DOCUMENTS

| 3,497,005 | A | * | 2/1970 | Pelopsky | ................ C10G 1/00 166/247 |
| 5,129,468 | A | | 7/1992 | Parmenter | |
| 5,246,684 | A | | 9/1993 | Brown et al. | |
| 5,472,620 | A | | 12/1995 | Huang | |
| 5,766,478 | A | | 6/1998 | Smith et al. | |

(Continued)

FOREIGN PATENT DOCUMENTS

EP          0164225 A2    12/1985
KR   10-2010-0009968 A     1/2010
(Continued)

OTHER PUBLICATIONS

Examination Report issued in related GCC Patent Application No. GC 2019-37848 dated May 17, 2020, 3 pages.
(Continued)

*Primary Examiner* — Frances Tischler
(74) *Attorney, Agent, or Firm* — Tenley Krueger; Baker Botts L.L.P.

(57) ABSTRACT

Methods for breaking polymer-containing treatment fluids for use in subterranean formations are provided. In one or more embodiments, the methods comprise providing a treatment fluid comprising a base fluid and a polymer, wherein the treatment fluid was used to treat at least a portion of a subterranean formation; and sonicating at least a portion of the treatment fluid to at least partially reduce the viscosity of the treatment fluid.

18 Claims, 5 Drawing Sheets

(56) References Cited

U.S. PATENT DOCUMENTS

| | | | |
|---|---|---|---|
| 5,891,956 | A | 4/1999 | Smith et al. |
| 6,269,880 | B1 | 8/2001 | Landry |
| 7,144,512 | B2 | 12/2006 | Qu et al. |
| 7,172,703 | B2 | 2/2007 | Javora et al. |
| 7,201,225 | B2 | 4/2007 | Smith et al. |
| 7,546,874 | B2 | 6/2009 | Smith et al. |
| 7,674,384 | B2 | 3/2010 | Javora et al. |
| 7,736,521 | B2 | 6/2010 | Sloan et al. |
| 7,905,287 | B2 | 3/2011 | Oyler et al. |
| 8,123,953 | B2 | 2/2012 | Gibbison |
| 9,005,686 | B2 | 4/2015 | Bates et al. |
| 9,034,180 | B2 | 5/2015 | McGuire |
| 9,215,891 | B2 | 12/2015 | Nazir et al. |
| 9,249,478 | B2 | 2/2016 | Harrison et al. |
| 9,644,126 | B2 | 5/2017 | Harrison et al. |
| 2009/0183922 | A1 | 7/2009 | Smith et al. |
| 2009/0220652 | A1 | 9/2009 | Gardner et al. |
| 2009/0321260 | A1 | 12/2009 | Andersen |
| 2010/0184630 | A1 | 7/2010 | Sullivan et al. |
| 2011/0259761 | A1 | 10/2011 | McGuire et al. |
| 2011/0278153 | A1 | 11/2011 | Bates et al. |
| 2013/0112413 | A1 | 5/2013 | Muthusamy et al. |
| 2014/0262228 | A1* | 9/2014 | Deville .................. C09K 8/467 166/249 |
| 2014/0263089 | A1 | 9/2014 | Agolli et al. |
| 2014/0290957 | A1* | 10/2014 | McGuire .................. C02F 9/00 166/308.1 |
| 2014/0360945 | A1 | 12/2014 | Vittur |
| 2016/0032176 | A1 | 2/2016 | Jiang et al. |
| 2016/0160110 | A1 | 6/2016 | Miller |
| 2016/0356122 | A1 | 12/2016 | Armstrong et al. |
| 2017/0136427 | A1 | 5/2017 | Smith |
| 2018/0023376 | A1 | 1/2018 | Davis et al. |
| 2019/0031793 | A1 | 1/2019 | Smith |

FOREIGN PATENT DOCUMENTS

| | | |
|---|---|---|
| WO | 2004/092534 A1 | 10/2004 |
| WO | 2010012032 A1 | 2/2010 |
| WO | 2010/065603 A1 | 6/2010 |
| WO | 2017083951 A1 | 5/2017 |

OTHER PUBLICATIONS

International Search Report and Written Opinion issued in related PCT Application No. PCT/US2019/035556 dated Oct. 8, 2019, 12 pages.

International Preliminary Report on Patentability issued in related PCT Application No. PCT/US2019/035556 dated Jan. 7, 2021, 9 pages.

* cited by examiner

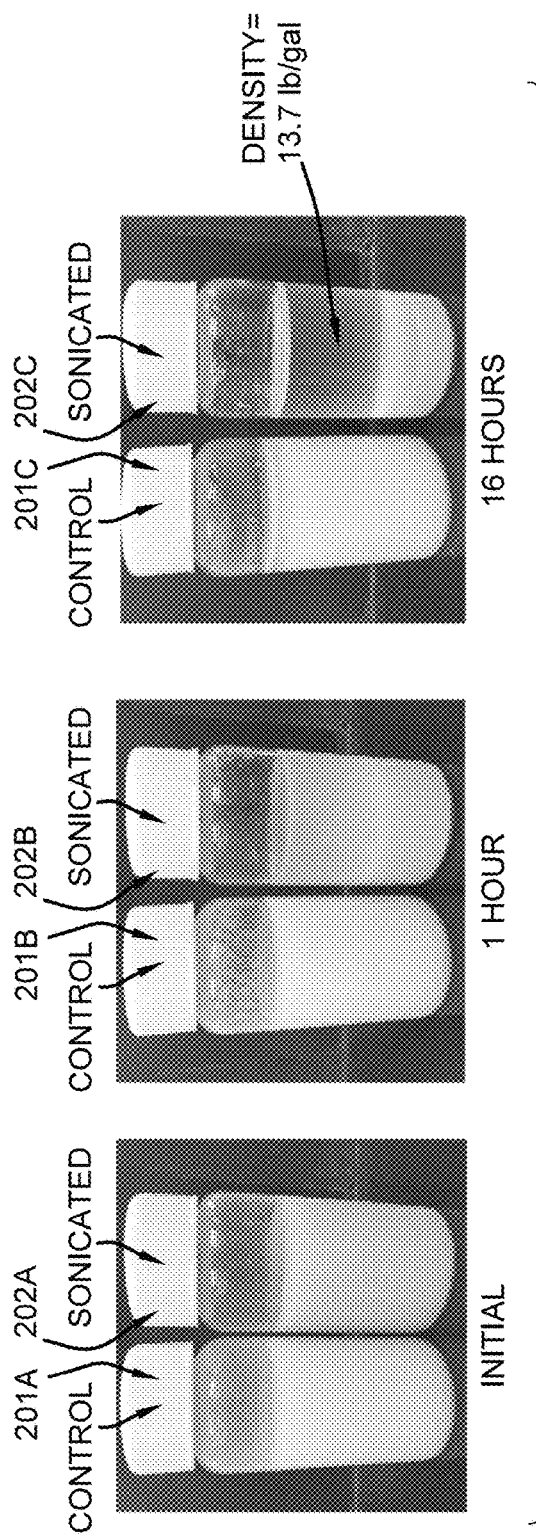
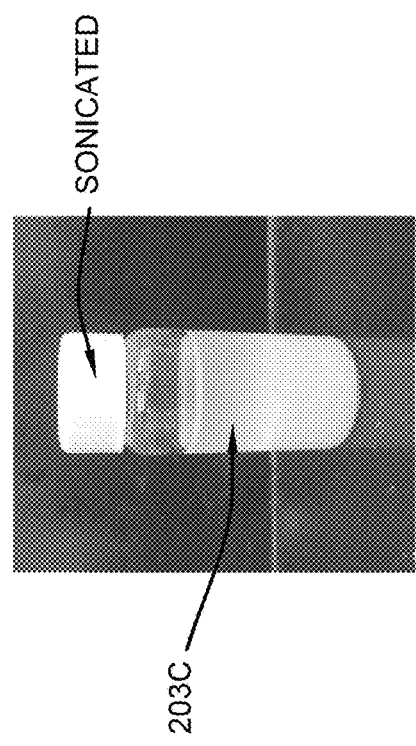
Figure 2A
Figure 2B

INITIAL

16 HOURS

ULTRASONIC BREAKING OF POLYMER-CONTAINING FLUIDS FOR USE IN SUBTERRANEAN FORMATIONS

CROSS REFERENCE TO RELATED APPLICATION

This application claims priority from U.S. Provisional Application Ser. No. 62/692,337, entitled "ULTRASONIC BREAKING OF POLYMER-CONTAINING FLUIDS FOR USE IN SUBTERRANEAN FORMATIONS" filed on Jun. 29, 2018, the entire disclosure of which is incorporated herein by reference.

BACKGROUND

The present disclosure relates to methods for breaking polymer-containing treatment fluids for use in subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling, fracturing, competition, and the like.

For example, while drilling an oil or gas well, a drilling fluid (or drilling mud) is typically pumped down to a drill bit during drilling operations and flowed back to the surface through an annulus defined between a drill string and the walls of the wellbore. Drilling fluids often include viscosifiers to, for example, improve the ability of the drilling fluid to remove cuttings from the wellbore and suspend cuttings.

Unconsolidated or poorly consolidated formations generally are high permeability production intervals and are often drilled with specialized drilling fluids referred to in the art as "drill-in fluids." Drill-in fluids are specially designed for drilling through a subsurface hydrocarbon reservoir portion of a wellbore. Such fluids are generally formulated to minimize formation damage and maximize production of the zones exposed by the drilling. Like drilling fluids, drill-in fluids generally include polymers for providing viscosity, suspension, and fluid loss control.

Many polymers used in drilling fluids, drill-in fluids, and other subterranean treatment fluids have been designed to be stable under the extreme conditions of subterranean formations, such as high temperatures and high pressures. After the desired application of a treatment fluid has been achieved, it is often desirable to reduce the viscosity of the fluid. Reducing the viscosity of a fluid is commonly referred to as "breaking" the fluid. Breaking of fluids has been accomplished using chemical breakers. However, the robust nature of the polymers typically used in drilling and drill-in fluids presents a challenge when breaking the polymers with chemical breakers, particularly at the surface in the absence of high temperatures and pressures.

BRIEF DESCRIPTION OF THE DRAWINGS

These drawings illustrate certain aspects of some of the embodiments of the present disclosure and should not be used to limit or define the claims.

FIGS. 2A and 2B are a series of photographs illustrating the suspension and settling of solids in control and sonicated drill-in fluid samples in accordance with certain embodiments of the present disclosure.

Figure 1:
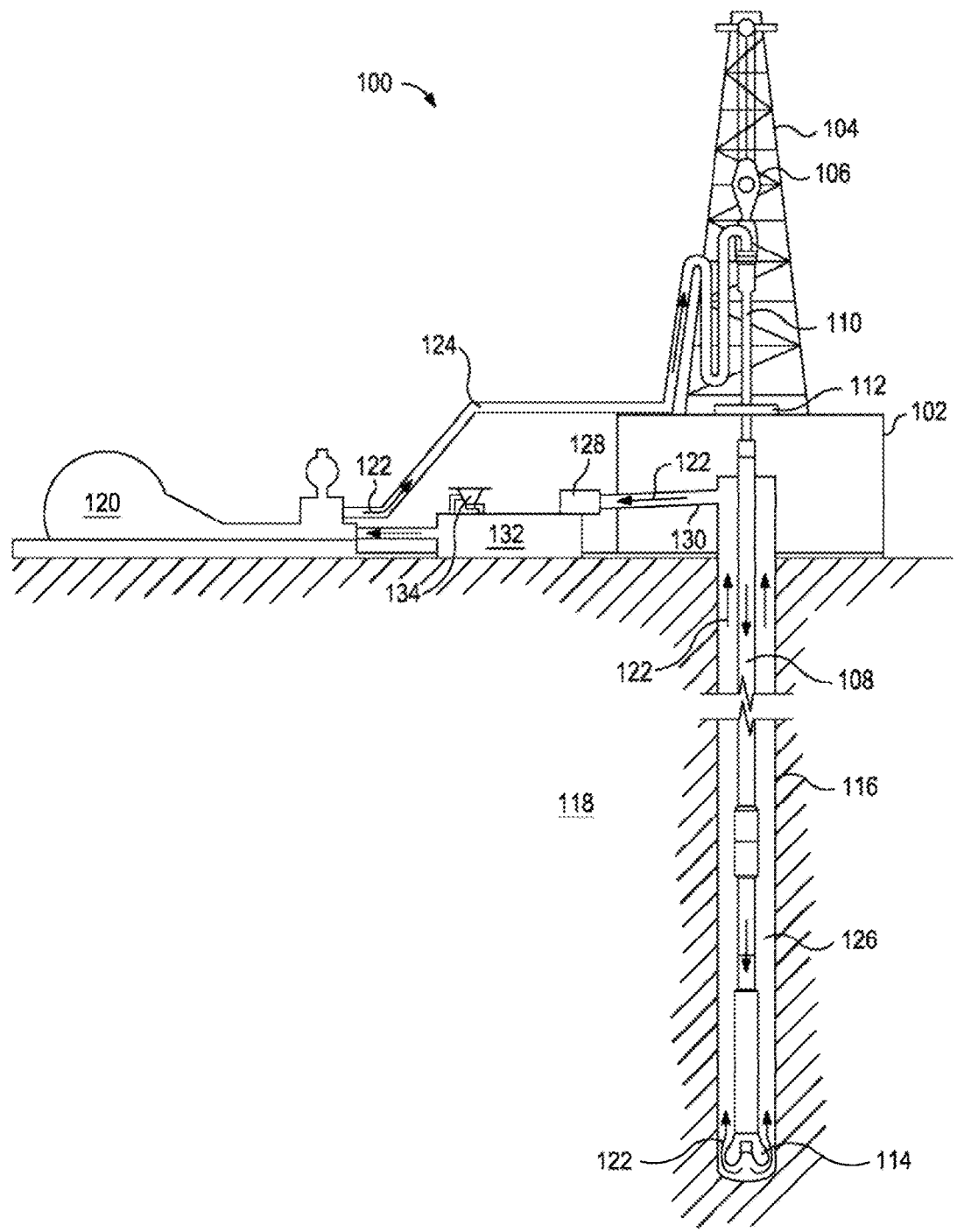
FIG. 1 is a diagram illustrating an example of a drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those of ordinary skill in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

The present disclosure relates to methods for breaking polymer-containing treatment fluids for use in subterranean formations. More specifically, the present disclosure provides methods for breaking polymer-containing treatment fluids for use in subterranean formations using ultrasonication to reclaim or recycle the base fluids of the treatment fluids. In certain embodiments, the methods of the present disclosure include providing a treatment fluid including a base fluid and at least one polymer and sonicating at least a portion of the treatment fluid with an ultrasonic wave to at least partially reduce the viscosity and/or suspension properties of the treatment fluid. In some embodiments, the treatment fluid may also include (e.g., have suspended therein) at least one solid, such as a bridging agent. In certain embodiments, the treatment fluids used in the methods of the present disclosure may be used or have been used to treat a subterranean formation (e.g., as a drilling fluid or a drill-in fluid) prior to sonication. In certain embodiments, the methods of the present disclosure also may include applying a separation or removal technique to the treatment fluid to substantially separate the base fluid of the treatment fluid from the other components of the treatment fluid (e.g., solids).

Those of ordinary skill in the art having the benefit of the present disclosure will appreciate the types of treatment fluids including a base fluid and one or more polymers disclosed herein that may be used in accordance with the methods of the present disclosure. Examples of such treatment fluids include, but are not limited to, drill-in fluids, drilling fluids, completion fluids, workover fluids, fracturing fluids, acidizing fluids, suspension fluids, breaker fluids, packer fluids, logging fluids, spacer fluids, transition fluids, and the like. In certain embodiments, the treatment fluids of the present disclosure may include any base fluid known in the art, including aqueous base fluids, non-aqueous base fluids, and any combinations thereof. The term "base fluid" refers to the major component of the fluid (as opposed to components dissolved and/or suspended therein) and does not indicate any particular condition or property of that fluids such as its mass, amount, pH, etc. Examples of non-aqueous fluids that may be suitable for use in the methods and systems of the present disclosure include, but are not limited to, oils, hydrocarbons, organic liquids, and the like. In certain embodiments, the base fluid may be an oil-in-water emulsion or a water-in-oil emulsion.

Aqueous base fluids that may be suitable for use in the methods of the present disclosure may include water from any source. Such aqueous base fluids may include fresh water, salt water (e.g., water containing one or more salts dissolved therein), brine (e.g., saturated salt water), seawater, or any combination thereof. In some embodiments, the aqueous base fluids may include one or more ionic species, such as those formed by salts dissolved in water. For example, seawater and/or produced water may include a variety of divalent cationic species dissolved therein. The ionic species may be any suitable ionic species known in the art. In certain embodiments, the ionic species may be one or more salts selected from the group consisting of: sodium chloride, sodium bromide, sodium iodide, sodium acetate, sodium formate, sodium citrate, potassium chloride, potassium formate, potassium iodide, potassium bromide, calcium chloride, calcium nitrate, calcium bromide, calcium iodide, magnesium chloride, magnesium bromide, magnesium sulfate, cesium formate, zinc chloride, zinc bromide, zinc iodide, and any combination thereof. In certain embodiments, the density of the aqueous base fluid can be adjusted to, among other purposes, provide additional particulate transport and suspension. In certain embodiments, the pH of the aqueous base fluid may be adjusted (e.g., by a buffer or other pH adjusting agent) to a specific level, which may depend on, among other factors, the types of clays, acids, and other additives included in the fluid. One of ordinary skill in the art with the benefit of this disclosure will recognize when such density and/or pH adjustments are appropriate.

In certain embodiments, the treatment fluids of the present disclosure may include one or more polymers. In certain embodiments, the polymers used in the methods of the present disclosure may have a molecular weight equal to or greater than about 30,000 g/mol. The polymers suitable for use in the treatment fluids of the present disclosure include any polymer that is capable of increasing the viscosity, suspension, and/or filtration control of a fluid. In certain embodiments, the polymers used in the treatment fluids of the present disclosure may be a naturally-occurring polymer (or derived therefrom), a synthetic polymer, and/or combinations thereof. Examples of suitable polymers include, but are not limited to, guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, welan gum, alginate, etc.), starches, starch derivatives (e.g., carboxymethyl starch), poly(styrene-butadiene), poly(styrene-acrylate), poly(styrene-sulfonate), polyethylene, polypropylene, polyethylene glycol, polypropylene glycol, polyvinyl alcohol, polyvinylchloride, polylactic acid, polyacrylamide, polyvinylpyrrolidone, poly(2-acrylamido-2-methyl-1-propanesulfonic acid), polyacrylate, partially hydrolyzed polyacrylate, polyethylene glycol, polypropylene glycol, any homopolymers thereof, any copolymers thereof, any tetrapolymers thereof, any crosslinked versions thereof, and/or combinations thereof. Examples of suitable polymers include a xanthan polymer commercially available from Halliburton Energy Services, Inc., of Houston, Tex., under the trade name "N-VIS®;" a hydroxyethyl cellulose polymer commercially available from Halliburton Energy Services, Inc., of Houston, Tex., under the trade name "LIQUI-VIS® EP;" and a crosslinked starch polymer commercially available from Halliburton Energy Services, Inc., of Houston, Tex., under the trade name "N-DRIL™ HT PLUS™." In certain embodiments, the polymers may be "crosslinked" with a crosslinking agent to, among other reasons, impart enhanced viscosity and/or suspension properties to the fluid.

The polymers may be included in any amount sufficient to impart the desired viscosity, suspension, and/or filtration control properties to the fluid. In certain embodiments, the one or more polymers may be included in an amount of from about 0.1 lb/bbl of the treatment fluid to about 20 lb/bbl of the treatment fluid. In other embodiments, the one or more polymers may be included in an amount of from about 1 lb/bbl of the treatment fluid to about 15 lb/bbl of the treatment fluid. In other embodiments, the one or more polymers may be included in an amount of from about 2 lb/bbl of the treatment fluid to about 10 lb/bbl of the treatment fluid. In other embodiments, the one or more polymers may be included in an amount of from about 0.5 lb/bbl of the treatment fluid to about 5 lb/bbl of the treatment fluid. In other embodiments, the one or more polymers may be included in an amount of from about 1 lb/bbl of the treatment fluid to about 8 lb/bbl of the treatment fluid.

In other embodiments, the one or more polymers may be included in an amount of less than about 20 lb/bbl. In other embodiments, the one or more polymers may be included in an amount of less than about 15 lb/bbl. In other embodiments, the one or more polymers may be included in an amount of less than about 12 lb/bbl. In other embodiments, the one or more polymers may be included in an amount of less than about 10 lb/bbl. In other embodiments, the one or more polymers may be included in an amount of less than about 8 lb/bbl.

In certain embodiments, the treatment fluids of the present disclosure may include one or more lost circulation materials or bridging agents. In certain embodiments, lost circulation materials or bridging agents may include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); acid soluble bridging solids including magnesium and calcium carbonate, limestone, marble, dolomite, iron carbonate, iron oxide, calcium oxide, magnesium oxide, perborate salts and the like; and any combination thereof.

In certain embodiments, the treatment fluids of the present disclosure may include any number of additives. Examples of such additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, additional bridging agents, flocculants, $H_2S$ scavengers, $CO_2$ scavengers, oxygen scavengers, lubricants, hydrocarbons, additional viscosifying/gelling agents, breakers, weighting agents, relative permeability modifiers, resins, wetting agents, coating enhancement agents, filter cake removal agents, antifreeze agents (e.g., ethylene glycol), particulates, and the like. A person skilled in the art, with the benefit of this disclosure, will recognize the types of additives that may be included in the treatment fluids of the present disclosure for a particular application. In certain embodiments, the treatment fluids used in the methods of the present disclosure may be used or have been used to treat a subterranean formation (e.g., as a drilling fluid or drill-in fluid). Thus, the treatment fluids may also include solids, such as loss circulation materials, bridging agents, solid breakers, internal breakers, proppant, solid alkalinity control agents, solids from the subterranean formation (e.g., rock fragments generated by the drill bit during drilling), and any combination thereof.

In certain embodiments, the methods of the present disclosure include sonicating at least a portion of the treatment fluids of the present disclosure. In one or more embodiments, sonicating the treatment fluids may include exposing and/or irradiating the treatment fluids with an ultrasonic wave. In certain embodiments, the ultrasonic wave may have sufficient energy to cause cavitation of the treatment fluid, resulting in at least partial chain scission of the polymer. Thus, sonicating the treatment fluid (e.g., exposing or irradiating the treatment fluid with an ultrasonic wave) may at least partially reduce the viscosity and/or suspension properties of the treatment fluids by at least partially "breaking" the polymer in the fluid. In certain embodiments, sonicating the treatment fluid does not substantially alter (increase or decrease) the density of the fluid. In certain embodiments, sonicating the treatment fluid does not substantially alter (increase or decrease) the moisture content of the fluid. As used herein, the term "substantially" means that the density and/or the moisture content of the fluid remains at least about 50%, 60%, 70%, 80%, 90%, 95%, 96%, 97%, 98%, 99%, 99.5%, 99.9%, 99.99%, alternatively at least about 99.999% or more, of the original value.

In certain embodiments, one or more sonication techniques may be used for sonicating the treatment fluids. Examples of suitable sonication techniques include, but are not limited to, submersion of an ultrasonic probe, ultrasonic horn, ultrasonic vibrator, ultrasonic homogenizer, or other sonication device into the treatment fluids; flow-through sonication, such as a flow-cell containing a sonicator; and indirect sonication (i.e., transmitting ultrasonic waves through a fluid that is indirect contact with another fluid (e.g., an ultrasonic bath)). Those of ordinary skill in the art having the benefit of the present disclosure will appreciate other sonication techniques that may be used in accordance with the methods of this disclosure. In certain embodiments, multiple sonication techniques (either the same or different) may be applied to the fluid in parallel or series.

In certain embodiments, additional methods for reducing the viscosity of the treatment fluid may also be utilized in addition to sonicating the fluid. Such additional methods include, but are not limited to, applying pressure and/or heat to the treatment fluid and adding chemical breakers to the treatment fluid. In such embodiments, chemical breakers may be added before, after, and/or during sonication. In some embodiments, the chemical breaker may be ineffective in breaking the polymers in the treatment fluid on its own. However, it may aid in breaking the polymers in the treatment fluid before, after, and/or during sonication. In some embodiments, the sonication may make the chemical breaker more effective. In some embodiments, the chemical breaker may not impact or impede the sonication. In certain embodiments, the sonication of the treatment fluid is performed at ambient temperature and/or pressure. In certain embodiments, other chemicals may be added to the fluid to aid in sonicating the fluid (e.g., through chemical oxidation). Examples of such chemical include ozone and carbon dioxide. In certain embodiments, the methods of the present disclosure do not use ozone, carbon dioxide, and/or chemical oxidation in connection with the sonication technique. In certain embodiments, ozone and/or carbon dioxide is not added to the fluid before or during sonication.

In certain embodiments, an ultrasonic probe/horn (or other device) may vibrate at a frequency and amplitude resulting in a power intensity sufficient to cause cavitation of the treatment fluid. In certain embodiments, the ultrasonic probe/horn (or other device) may vibrate with a frequency in a range from about 18 kHz to about 22 kHz. In certain embodiments, the ultrasonic probe/horn (or other device) may vibrate with a frequency in a range from about 22 kHz to about 500 kHz. In certain embodiments, the ultrasonic probe/horn (or other device) may vibrate with a frequency in a range from about 18 kHz to about 1 MHz. In other embodiments, the ultrasonic probe/horn (or other device) may vibrate with a frequency greater than about 1 MHz.

In certain embodiments, the ultrasonic probe/horn (or other device) may vibrate with an amplitude in a range from about 10 microns to about 200 microns. In other embodiments, the ultrasonic probe/horn (or other device) vibrate with an amplitude in a range from about 10 microns to about 150 microns. In other embodiments, the ultrasonic probe/horn (or other device) vibrate with an amplitude in a range from about 10 microns to about 200 microns.

In certain embodiments, the ultrasonic probe/horn (or other device) may generate a power intensity in a range from about 10 W/cm$^2$ to about 300 W/cm$^2$. In other embodiments, the ultrasonic probe/horn (or other device) may generate a power intensity greater than about 300 W/cm$^2$. Those of ordinary skill in the art having the benefit of the present disclosure will recognize that the power intensity depends on, among other things, the amplitude, the diameter of the ultrasonic probe/horn (or other device), and/or the fluid.

In certain embodiments, the treatment fluid may be sonicated (e.g., exposed to and/or irradiate with an ultrasonic wave) for a sufficient length of time to cause cavitation of the treatment fluid and/or achieve a desire reduction in the viscosity and/or suspension properties of the treatment fluid. In certain embodiments, the treatment fluid may be sonicated (e.g., exposed to and/or irradiate with an ultrasonic wave) for a time in a range of about 1 second to about 10 minutes. In other embodiments, the treatment fluid may be sonicated (e.g., exposed to and/or irradiate with an ultrasonic wave) for a time greater than about 10 minutes. Those of ordinary skill in the art having the benefit of the present disclosure will appreciate that the residence time for a given volume of the treatment fluid in the flow-through sonicator would be dictated by the flow rate of the fluid. Those of ordinary skill in the art having the benefit of the present disclosure will appreciate that any volume of treatment fluid may be sonicated using the methods of the present disclosure and that the residence time may be impacted by the volume of the fluid.

In certain embodiments, the treatment fluids may be cooled during the sonication to mitigate at least a portion of the heat generating during the sonication. In certain embodiments, the treatment fluids may be allowed to sit static for a period of time, among other reasons, to allow the reduction in the viscosity and/or suspension properties of the fluid to occur and/or to allow the components in the fluid (e.g., bridging agents) to settle and/or separate from the base fluid.

In certain embodiments, the methods of the present disclosure also may include the use of one or more separation or removal techniques on the treatment fluids to separate the base fluid (e.g., brine) from the other components of the fluid (e.g., solids). Examples of suitable techniques for removing solids from the base fluid include, but are not limited to, settling, decantation, filtration, centrifugation, dissolution or dissolving (e.g., with acid), and any combination thereof. In some embodiment, the methods of the present disclosure also may include the use of other separation techniques (e.g., distillation) to remove other components (e.g., salts) from the base fluid. Those of ordinary skill in the art having the benefit of the present disclosure will appreciate other separation or removal techniques that may be used in accordance with the methods of this disclosure.

In certain embodiments, the base fluid (e.g., brine) of the treatment fluid may be recovered following the sonication technique(s) and/or the separation or removal technique(s). In such embodiments, the recovered base fluid may be recycled or reused. For example, in certain embodiments, the recovered base fluid may be introduced into a subterranean formation and/or a wellbore penetrating a subterranean formation. In such embodiment, additional additives, such as those disclosed herein, may be added to the recovered base fluid before it is introduced into the subterranean formation and/or the wellbore. In some embodiments, the recovered base fluid may be blended with a fresh based fluid (e.g., a fluid that has not yet been used to treat a subterranean formation) before it is introduced into the subterranean formation and/or the wellbore. In such embodiments, less polymer may be needed in the fresh based fluid because of the polymer remaining in the reclaimed base fluid.

Some embodiments of the present disclosure provide methods for using the disclosed treatment fluids to carry out a variety of subterranean treatments, including but not limited to, drilling. The drilling and/or drill-in fluids disclosed herein may directly or indirectly affect one or more components or pieces of equipment associated with the preparation, delivery, recapture, recycling, reuse, and/or disposal of the drilling and/or drill-in fluids. For example, and with reference to FIG. 1, the drilling and/or drill-in fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling and/or drill-in fluid 122 of the present disclosure through a feed pipe 124 and to the kelly 110, which conveys the drilling and/or drill-in fluid 122 downhole through the interior of the drill string 108 and through one or more orifices in the drill bit 114. The drilling and/or drill-in fluid 122 may then circulated back to the surface via an annulus 126 defined between the drill string 108 and the walls of the borehole 116. At the surface, the recirculated or spent drilling and/or drill-in fluid 122 exits the annulus 126 and may be conveyed to one or more fluid processing unit(s) 128 via an interconnecting flow line 130. The sonication technique(s) and/or the separation or removal technique(s) disclose herein may be performed in the fluid processing unit(s) 128. After passing through the fluid processing unit(s) 128, a "cleaned" drilling and/or drill-in fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100, any other wellsite location, or an off-site location to facilitate its proper function, without departing from the scope of the disclosure.

One or more components disclosed herein may be added to the drilling and/or drill-in fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the components may be added to the drilling and/or drill-in fluid 122 at any other location in the drilling assembly 100, any other wellsite location, or an off-site location to facilitate its proper function. In at least one embodiment, for example, there could be more than one retention pit 132, such as multiple retention pits 132 in series. Moreover, the retention pit 132 may be representative of one or more fluid storage facilities and/or units where the drilling and/or drill-in fluid 122 or any component thereof (e.g., base fluid or brine) may be stored, reconditioned, and/or regulated until recycled or reused.

As mentioned above, the drilling and/or drill-in fluid 122 of the present disclosure may directly or indirectly affect the components and equipment of the drilling assembly 100. For example, the disclosed drilling and/or drill-in fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and/or any fluid reclamation equipment. The fluid processing unit(s) 128 may further include one or more sensors, gauges, pumps, compressors, and the like used to store, monitor, regulate, and/or recondition the drilling and/or drill-in fluid 122.

The drilling and/or drill-in fluid 122 of the present disclosure may directly or indirectly affect the pump 120, which representatively includes any conduits, pipelines, trucks, tubulars, and/or pipes used to fluidically convey the drilling and/or drill-in fluid 122 downhole, any pumps, compressors, or motors (e.g., topside or downhole) used to drive the drilling and/or drill-in fluid 122 into motion, any valves or related joints used to regulate the pressure or flow rate of the drilling and/or drill-in fluid 122, and any sensors (i.e., pressure, temperature, flow rate, etc.), gauges, and/or combinations thereof, and the like. The disclosed drilling and/or drill-in fluid 122 may also directly or indirectly affect the mixing hopper 134 and the retention pit 132 and their assorted variations.

The drilling and/or drill-in fluid 122 of the present disclosure may also directly or indirectly affect the various downhole equipment and tools that may come into contact with the drilling and/or drill-in fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling and/or drill-in fluid 122 may also directly or indirectly affect any downhole heat exchangers, valves and corresponding actuation devices, tool seals, packers and other wellbore isolation devices or components, and the like associated with the wellbore 116. The disclosed drilling and/or drill-in fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling and/or drill-in fluid 122 of the present disclosure may also directly or indirectly affect any transport or delivery equipment used to convey the drilling and/or drill-in fluid 122 to the drilling assembly 100 such as, for example, any transport vessels, conduits, pipelines, trucks, tubulars, and/or pipes used to fluidically move the drilling and/or drill-in fluid 122 from one location to another, any pumps, compressors, or motors used to drive the drilling and/or drill-in fluid 122 into motion, any valves or related joints used to regulate the pressure or flow rate of the drilling and/or drill-in fluid 122, and any sensors (i.e., pressure and temperature), gauges, and/or combinations thereof, and the like.

An embodiment of the present disclosure is a method including: providing a treatment fluid comprising a base fluid and a polymer, wherein the treatment fluid was used to treat at least a portion of a subterranean formation; and sonicating at least a portion of the treatment fluid to at least partially reduce the viscosity of the treatment fluid.

In one or more embodiments described in the preceding paragraph, the treatment fluid further comprises solids, and wherein the method further comprises separating or removing at least a portion of the solids from the treatment fluid after sonicating at least the portion of the treatment fluid. In one or more embodiments described in the preceding paragraph, the portion of the solids is separated or removed from the base fluid using a separation or removal technique selected from the group consisting of: settling, decantation, filtration, centrifugation, dissolving, dissolution, and any combination thereof. In one or more embodiments described in the preceding paragraph, adding one or more additives to the base fluid after the portion of the solids has been separated or removed from the base fluid to form a second treatment fluid; and introducing the second treatment fluid into at least a portion of the subterranean formation. In one or more embodiments described in the preceding paragraph, the portion of the treatment fluid is sonicated using a sonication technique selected from the group consisting of: submersion of an ultrasonic probe, submersion of an ultrasonic horn, flow-through sonication, indirect sonication, and any combination thereof. In one or more embodiments described in the preceding paragraph, sonicating at least the portion of the treatment fluid comprising subjected the treatment fluid to an ultrasonic device that vibrates at a frequency in a range from about 18 kHz to about 1 MHz. In one or more embodiments described in the preceding paragraph, sonicating at least the portion of the treatment fluid comprises subjected the treatment fluid to an ultrasonic device that vibrates with an amplitude in a range from about 10 microns to about 200 microns. In one or more embodiments described in the preceding paragraph, cooling at least the portion of the treatment fluid during sonication. In one or more embodiments described in the preceding paragraph, the polymer has a molecular weight equal to or greater than about 30,000 g/mol. In one or more embodiments described in the preceding paragraph, sonicating at least the portion of the treatment fluid does not substantially alter the density of the fluid. In one or more embodiments described in the preceding paragraph, the portion of the treatment fluid being sonicated does not comprise ozone. In one or more embodiments described in the preceding paragraph, adding a chemical breaker to the treatment fluid before or after sonication. In one or more embodiments described in the preceding paragraph, the polymer is selected from the group consisting of: a naturally-occurring polymer, a derivative therefrom, a synthetic polymer, and any combination thereof.

Another embodiment of the present disclosure is a method including: providing a treatment fluid comprising a base fluid, at least one polymer, and solids; and sonicating at least a portion the treatment fluid to at least partially reduce a viscosity of the treatment fluid.

In one or more embodiments described in the preceding paragraph, separating or removing at least a portion of the solids from the treatment fluid after sonicating the treatment fluid. In one or more embodiments described in the preceding paragraph, the portion of the treatment fluid is sonicated using a sonication technique selected from the group consisting of: submersion of an ultrasonic probe, submersion of an ultrasonic horn, flow-through sonication, indirect sonication, and any combination thereof. In one or more embodiments described in the preceding paragraph, sonicating the portion of the treatment fluid does not substantially alter the density of the fluid.

Another embodiment of the present disclosure is a composition including: providing a treatment fluid comprising a base fluid and a polymer, wherein the treatment fluid was used to treat at least a portion of a subterranean formation; and sonicating at least a portion the treatment fluid using a sonication technique, wherein the portion of the treatment fluid being sonicated does not comprise ozone.

In one or more embodiments described in the preceding paragraph, the treatment fluid further comprises solids, and wherein the method further comprising separating or removing at least a portion of the solids from the treatment fluid using a separation or removal technique selected from the group consisting of: settling, decantation, filtration, centrifugation, dissolving, dissolution, and any combination thereof. In one or more embodiments described in the preceding paragraph, the portion of the treatment fluid is sonicated using a sonication technique selected from the group consisting of: submersion of an ultrasonic probe, submersion of an ultrasonic horn, flow-through sonication, indirect sonication, and any combination thereof.

EXAMPLES

To facilitate a better understanding of the present disclosure, the following examples of certain aspects of certain embodiments are given. The following examples are not the only examples that could be given according to the present disclosure and are not intended to limit the scope of the disclosure or claims.

Example 1

A DRIL-N™ clay-free, aqueous brine reservoir drilling fluid (commercially available from Halliburton Energy Services, Inc.) was received from the field after being used to treat a subterranean formation. The fluid was vigorously shaken, and two aliquots of the fluid were transferred to two 20 mL vials by pipette to provide one control sample (201A) and one sonicated sample (202A). The control sample was allowed to sit static at room temperature for about 16 hours. The vial containing sonicated sample was placed in an ice bath to mitigate heat generated during sonication. An ultrasonicator probe tip was submerged into the vial, and the sonicated sample was sonicated for about 10 minutes at 50% amplitude (100 microns). The vial was then sealed and allowed to remain static at room temperature for about 16 hours. A third aliquot of the DRIL-N™ aqueous brine fluid also was transferred to another 20 mL vial by pipette. This sample was sonicated for about 10 seconds using the submerged ultrasonicator probe tip and then sealed and allowed to remain static at room temperature for about 16 hours.

As shown FIG. 2A, the bridging agent was initially almost completely suspended in both the control sample (201A) and the sonicated sample (202A). After about one hour, the bridging agent remained almost completely suspended in the control sample (201B) while a portion of the bridging agent settled to the bottom of the vial containing the sonicated sample (202B). After about 16 hours, the bridging agent remained almost completely suspended in the control sample (201C) while the majority of the bridging agent settled to the bottom of the vial containing the sonicated sample (202C). Thus, Example 1 demonstrates the ability of sonication to reduce the suspension properties of the polymers in the fluid.

As shown in FIG. 2B, more of the bridging agent remained suspended in the sample sonicated for 10 seconds after 16 hours (203C) than the bridging agent in the sample sonicated for 10 minutes after 16 hours (202C). Thus, Example 1 also demonstrates that the length of sonication time may impact the ability of sonication to reduce the viscosity, suspension, and fluid loss properties of the polymers in the fluid.

Example 2

Figure 3A:
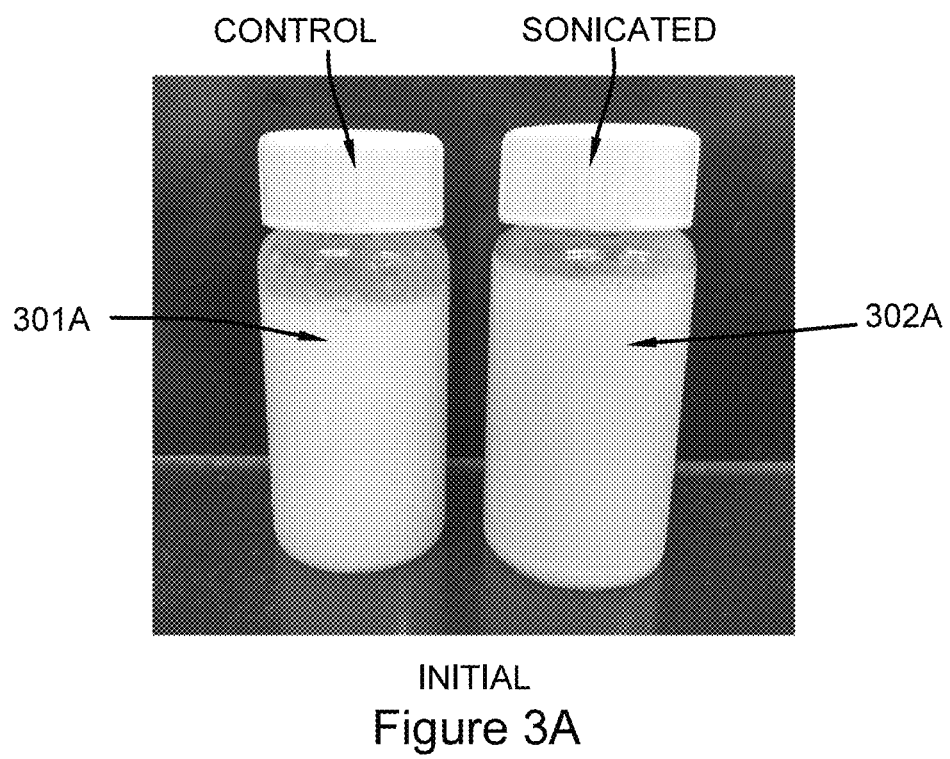
FIGS. 3A and 3B are a series of photographs illustrating the suspension and settling of solids in control and sonicated drill-in fluid samples in accordance with certain embodiments of the present disclosure.
Figure 3B:
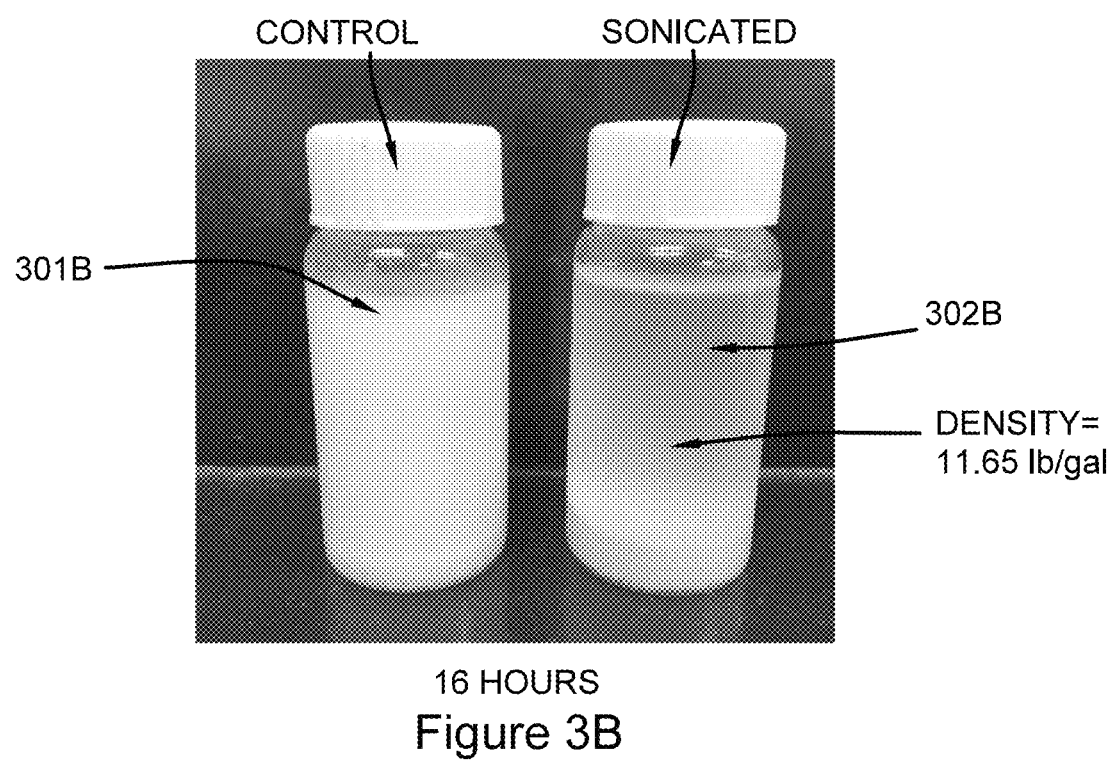

A fluid having the formulation shown in Table 1 was prepared. Two aliquots of the fluid were transferred to two 20 mL vials by pipette—one control sample (301A) and one sonicated sample (302A), as shown in FIGS. 3A and 3B. The control sample was allowed to sit static at room temperature for about 16 hours. The vial containing sonicated sample was placed in an ice bath to mitigate heat generated during sonication. An ultrasonicator probe tip was submerged into the vial, and the sonicated sample was sonicated for about 10 minutes at 50% amplitude (100 microns). The vial was then sealed and allowed to remain static at room temperature for about 16 hours.

TABLE 1

| | |
|---|---|
| 11.6 lb/gal CaCl2 Brine, bbl | 0.918 |
| LIQUI-VIS ® EP, lb (hydroxyethyl cellulose polymer) | 2.5 |
| N-DRIL ™ HT PLUS ™, lb (cross-linked starch polymer) | 7 |
| BARABUF ®, lb (pH buffer) | 1 |
| OXYGON ™, lb (non-sulfite oxygen scavenger) | 0.2 |
| BARACARB ® 50, lb (bridging agent) | 19.5 |
| BARACARB ® 150, lb (bridging agent) | 39 |
| BARACARB ® 600, lb (bridging agent) | 19.5 |

As shown FIG. 3A, the bridging agent was initially almost completely suspended in both the control sample (301A) and the sonicated sample (302A). As shown in FIG. 3B, the bridging agent remained almost completely suspended in the control sample (301B) after 16 hours while the majority of the bridging agent settled to the bottom of the vial containing the sonicated sample (302B) after 16 hours following sonication. Thus, Example 2 demonstrates the ability of sonication to reduce the viscosity, suspension, and fluid loss properties of the polymers in the fluid. The density of the sonicated sample (302B) was also measured to be 11.65 lb/gal after 16 hours following sonication. Thus, Example 2 also demonstrates that the density of the fluid remains substantially unaffected by the sonication.

Example 3

Figure 4A:
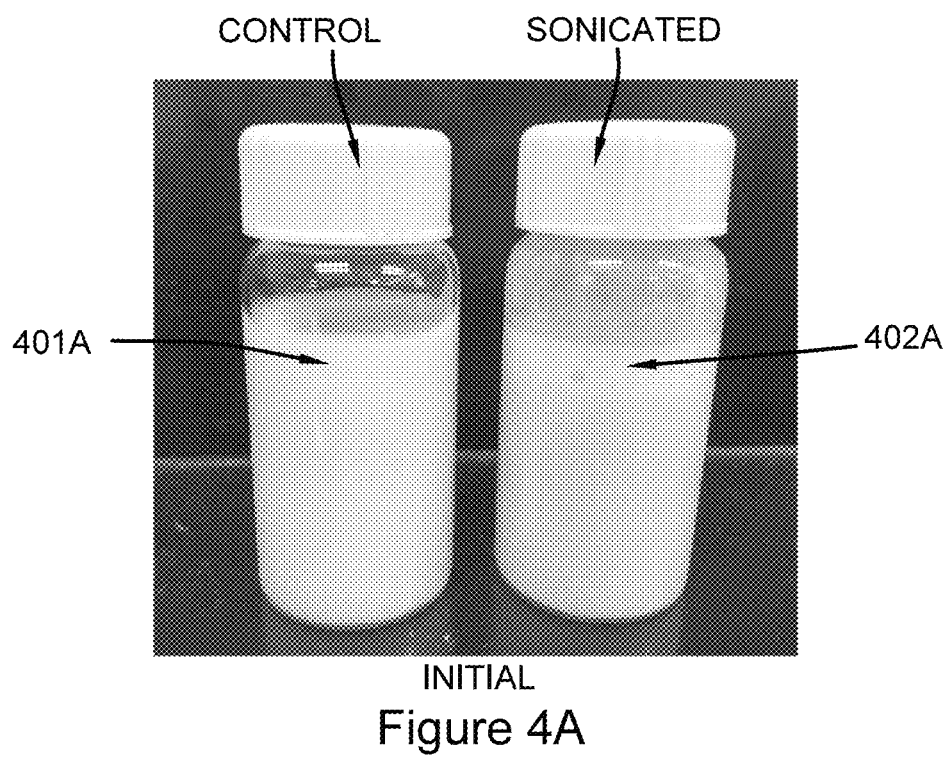
FIGS. 4A and 4B are a series of photographs illustrating the suspension and settling of solids in control and sonicated drill-in fluid samples in accordance with certain embodiments of the present disclosure.
Figure 4B:
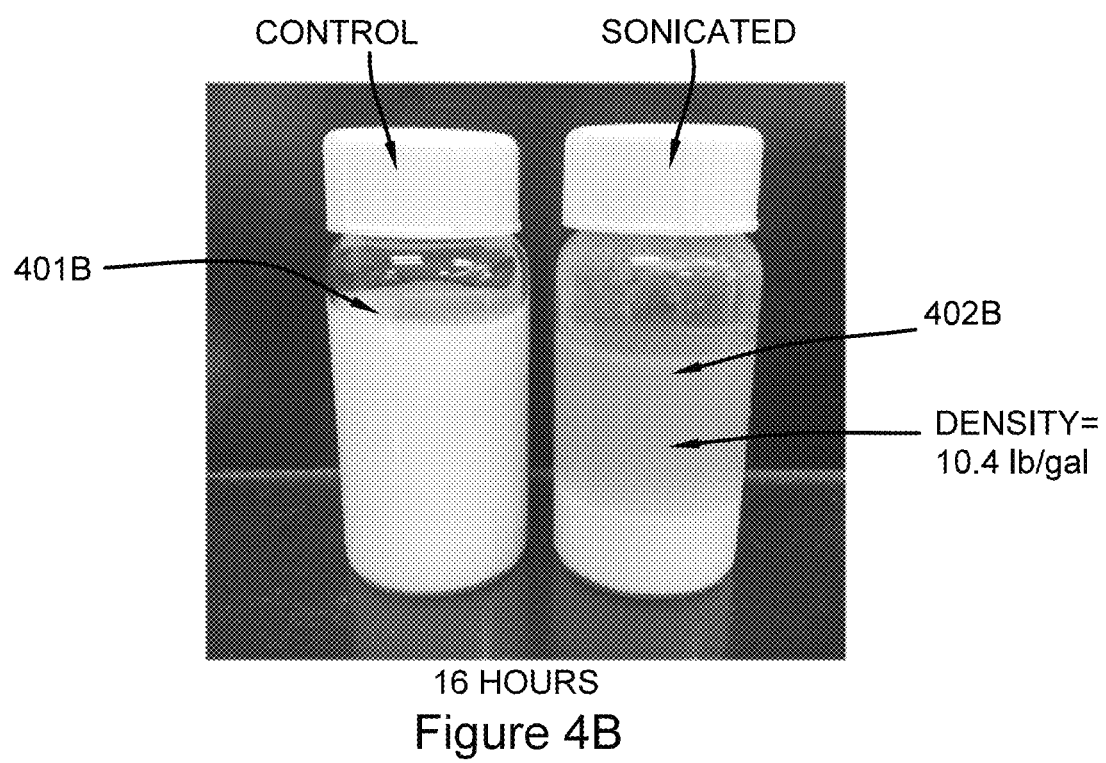

A fluid having the formulation shown in Table 2 was prepared. The initial density of the fluid was measured to be 11 lb/gal. Two aliquots of the fluid were transferred to two 30 mL vials by pipette—one control sample (401A) and one sonicated sample (402A), as shown in FIGS. 4A and 4B. The control sample was allowed to sit static at room temperature for about 16 hours. The vial containing sonicated sample was placed in an ice bath to mitigate heat generated during sonication. An ultrasonicator probe tip was submerged into the vial, and the sonicated sample was sonicated for about 10 minutes at 50% amplitude (100 microns). The vial was then sealed and allowed to remain static at room temperature for about 16 hours.

TABLE 2

| | |
|---|---|
| Water, bbl | 0.7389 |
| N-VIS ® EP, lb (hydroxyethyl cellulose polymer) | 2 |
| Sodium Chloride, lb | 76.5 |
| Potassium Chloride, lb | 42 |
| N-DRIL ™ HT PLUS ™, lb (cross-linked starch polymer) | 8 |
| BARACARB ® 5, lb (bridging agent) | 37.2 |
| BARACARB ® 50, lb (bridging agent) | 37.2 |

As shown FIG. 4A, the bridging agent was initially almost completely suspended in both the control sample (401A) and the sonicated sample (402A). As shown in FIG. 4B, the bridging agent remained almost completely suspended in the control sample (401B) after 16 hours while the majority of the bridging agent settled to the bottom of the vial containing the sonicated sample (402B) after 16 hours following sonication. Thus, Example 3 demonstrates the ability of sonication to reduce the viscosity, suspension, and fluid loss properties of the polymers in the fluid. The density of the sonicated sample (402B) was also measured to be 10.4 lb/gal after 16 hours following sonication while the density of the brine (i.e., water, sodium chloride, and potassium chloride) without sonication was measured to be 10.3 lb/gal. Thus, Example 3 also demonstrates that the density of the fluid remains substantially unaffected by the sonication Example 4

Figure 5:
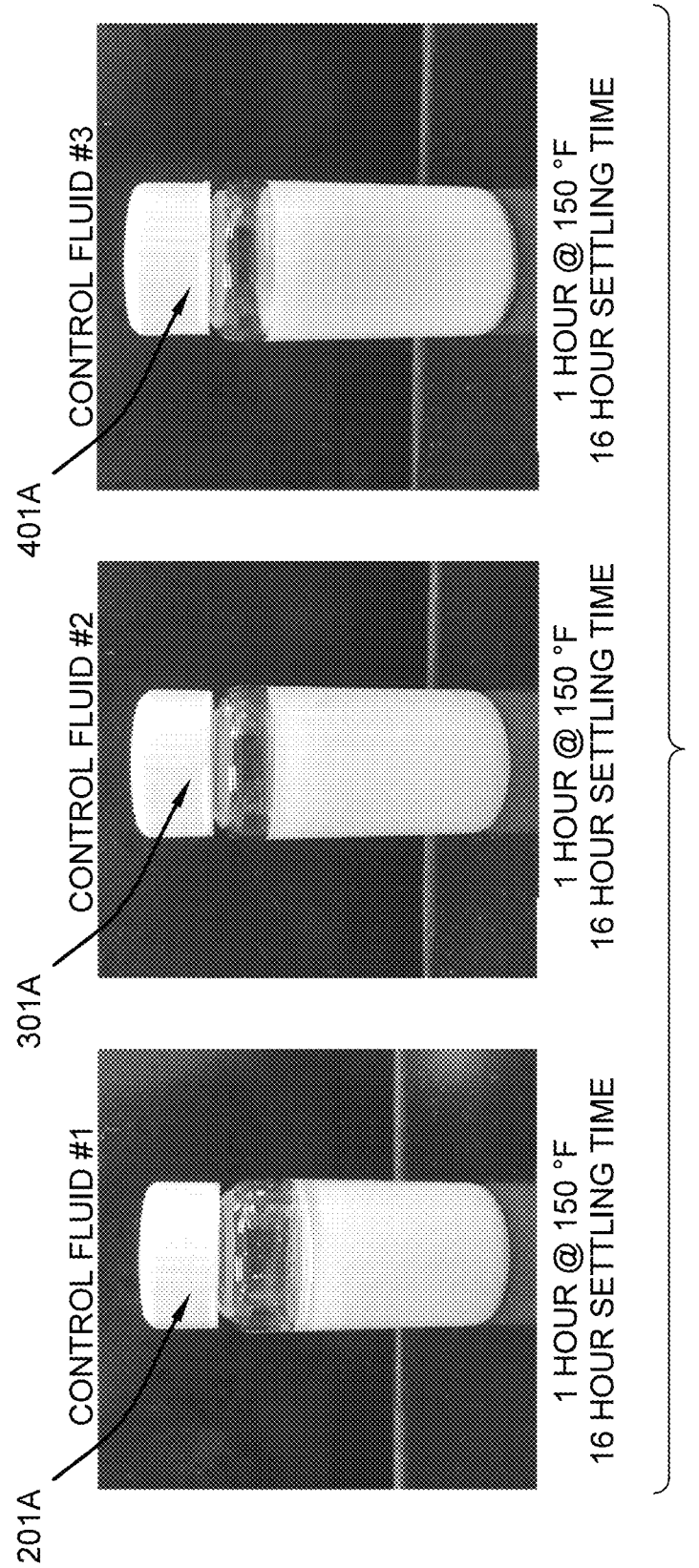
FIG. 5 is a series of photographs illustrating the suspension and settling of solids in a control drill-in fluid sample following application of thermal energy.

Each control sample from Examples 1-3 (201A, 301A, 401A) was subjected to thermal energy to determine whether thermal energy would provide the same outcome as ultrasonic energy. Each sample was placed in a 150° F. oven for about one hour. The samples were then allowed to sit static at room temperature for about 16 hours. As shown in FIG. 5, the bridging agent remained almost completely suspended in each of the samples after 16 hours. Thus, Example 4 demonstrates that sonication is more effective than thermal energy for reducing the viscosity, suspension, and fluid loss properties of the polymers in the fluids.

Example 5

A fluid (350 mL) having the formulation shown in Table 3 was prepared.

TABLE 3

| | |
|---|---|
| 14.2 lb/gal CaBr$_2$ Brine, mL | 297 |
| Water, bbl | 28 |
| BARADEFOAM HP, lb (defoamer) | 0.2 |
| BARABUF, lb (pH buffer) | 0.5 |
| BDF-638, lb (viscosifier) | 8 |
| BARACARB ® 5, lb (bridging agent) | 20 |
| BARACARB ® 50, lb (bridging agent) | 20 |
| Ultrabreake M, lb (breaker) | 1 | the initial rheology of the fluid was measured at 120° F., the results of which are shown in Table 4 below.

TABLE 4

| rpm | dial reading |
|---|---|
| 600 | 65 |
| 300 | 43 |
| 200 | 29 |
| 100 | 19 |
| 6 | 5 |
| 3 | 4 |
| 10 sec gel, lb/100 ft$^2$ | 3 |
| 10 min gel, lb/100 ft$^2$ | 3 |

The fluid was then submerged in an ice water bath to maintain the temperature of the fluid at 70° F. while the fluid was sonicated for 60 minutes. As shown in Table 5 below, the rheology of the fluid was measured about every 10 minutes. The rheology of the fluid decreased as the fluid was sonicated. Thus, Example 5 demonstrates the ability of sonication to reduce the viscosity, suspension, and fluid loss properties of the polymers in the fluid.

TABLE 4

| Time, min | 600 rpm dial reading | 6 rpm dial reading |
|---|---|---|
| 0 | 65 | 5 |
| 10 | 31 | 1 |
| 20 | 26 | 0 |
| 30 | 21 | 0 |
| 45 | 19 | 0 |
| 60 | 18.5 | 0 |

Example 6

A drill-in fluid of the present disclosure including a bromide-containing brine, a peroxide breaker (1 lb/bbl), and insoluble particles was sonicated using the sonication in accordance with the present disclosure. An acid was then added to the sonicated drill-in fluid. The insoluble particles remaining in the drill-in fluid after sonication were dissolved upon treatment with acid. Following treatment with the acid, a visible yellow color formed in the drill-in fluid. This indicates the presence of the peroxide breaker in the drill-in fluid after sonication because the acid activates the peroxide breaker to form an active oxidizer that then at least partially reacts with bromide in the brine to produce the yellow color. Thus, Example 6 demonstrates the chemical breaker was not degraded by the sonication.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those of ordinary skill in the art having the benefit of the teachings herein. While numerous changes may be made by those of ordinary skill in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
(a) providing a spent treatment fluid comprising a brine, one or more solids, and a first polymer, wherein the spent treatment fluid was used to treat at least a portion of a first subterranean formation;
(b) sonicating at least a portion of the spent treatment fluid to at least partially break the first polymer thereby reducing the viscosity of the spent treatment fluid, wherein the sonicating is performed outside of a wellbore penetrating the first subterranean formation;
(c) separating at least a portion of the one or more solids from the spent treatment fluid using a separation or removal technique selected from the group consisting of: settling, decantation, filtration, centrifugation, dissolving, dissolution, and any combination thereof, wherein the spent treatment fluid becomes a reclaimed treatment fluid comprising the broken first polymer after steps (b) and (c); and (d) introducing the reclaimed treatment fluid comprising the broken first polymer into at least a portion of a second subterranean formation.

2. The method of claim 1 further comprising adding one or more additives to the reclaimed treatment fluid.

3. The method of claim 1, wherein the portion of the spent treatment fluid is sonicated using a sonication technique selected from the group consisting of: submersion of an ultrasonic probe, submersion of an ultrasonic horn, flow-through sonication, indirect sonication, and any combination thereof.

4. The method of claim 1, wherein sonicating at least the portion of the spent treatment fluid comprises subjecting the spent treatment fluid to an ultrasonic device that vibrates at a frequency in a range from about 18 kHz to about 1 MHz.

5. The method of claim 1, wherein sonicating at least the portion of the spent treatment fluid comprises subjecting the spent treatment fluid to an ultrasonic device that vibrates with an amplitude in a range from about 10 microns to about 200 microns.

6. The method of claim 1 further comprising cooling at least the portion of the spent treatment fluid during sonication.

7. The method of claim 1, wherein the first polymer has a molecular weight equal to or greater than about 30,000 g/mol.

8. The method of claim 1, wherein sonicating at least the portion of the spent treatment fluid does not substantially alter the density of the fluid.

9. The method of claim 1, wherein the portion of the spent treatment fluid being sonicated does not comprise ozone.

10. The method of claim 1 further comprising adding a chemical breaker to the spent treatment fluid before or after sonication.

11. The method of claim 1, wherein the first polymer is selected from the group consisting of: a naturally-occurring polymer, a derivative therefrom, a synthetic polymer, and any combination thereof.

12. A method comprising:
(a) providing a treatment fluid comprising a base fluid, at least one polymer, and one or more solids;
(b) sonicating at least a portion of the treatment fluid to at least partially reduce a viscosity of the treatment fluid, wherein the sonicating is performed in a fluid processing unit outside of a wellbore penetrating a subterranean formation;
(c) separating at least a portion of the one or more solids from the treatment fluid using a separation or removal technique selected from the group consisting of: settling, decantation, filtration, centrifugation, and any combination thereof; and
(d) after septs (b) and (c), introducing the treatment fluid into at least a portion of the subterranean formation.

13. The method of claim 12, wherein the portion of the treatment fluid is sonicated using a sonication technique selected from the group consisting of: submersion of an ultrasonic probe, submersion of an ultrasonic horn, flow-through sonication, indirect sonication, and any combination thereof.

14. The method of claim 12, wherein sonicating the portion of the treatment fluid does not substantially alter the density of the fluid.

15. The method of claim 1, wherein the polymer is selected from the group consisting of: guar, poly(styrene-butadiene), poly(styrene-acrylate), poly(styrene-sulfonate), polyethylene, polypropylene, polyvinyl alcohol, polyvinylchloride, polyacrylamide, polyvinylpyrrolidone, poly(2-acrylamido-2-methyl-1-propanesulfonic acid), polyacrylate, partially hydrolyzed polyacrylate, and any combination thereof.

16. The method of claim 1, wherein the spent treatment fluid comprises the first polymer in an amount from about 0.1 lb/bbl of the spent treatment fluid to about 20 lb/bbl of the spent treatment fluid.

17. The method of claim 16 further comprising adding an amount of a second polymer to the reclaimed treatment fluid that is less than the amount of the first polymer in the spent treatment fluid.

18. The method of claim 1, wherein the first subterranean formation and the second subterranean formation are the same.

* * * * *